(12) United States Patent
Matsumoto et al.

(10) Patent No.: US 7,804,743 B2
(45) Date of Patent: Sep. 28, 2010

(54) THERMALLY ASSISTED MAGNETIC RECORDING HEAD AND METHOD OF MANUFACTURING THE SAME

(75) Inventors: Takuya Matsumoto, Hachioji (JP); Kimio Nakamura, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/467,624

(22) Filed: May 18, 2009

(65) Prior Publication Data
US 2009/0231747 A1 Sep. 17, 2009

Related U.S. Application Data

(63) Continuation of application No. 11/341,659, filed on Jan. 30, 2006, now abandoned.

(30) Foreign Application Priority Data
Apr. 5, 2005 (JP) .............................. 2005-108835

(51) Int. Cl.
*G11B 7/135* (2006.01)
*G11B 7/09* (2006.01)
*G11B 11/105* (2006.01)

(52) U.S. Cl. ................. 369/13.33; 369/300; 369/13.13; 369/13.17

(58) Field of Classification Search ............... 360/59, 360/128, 234.5; 369/13.13, 13.17, 13.33, 369/112.23, 300
See application file for complete search history.

(56) References Cited

U.S. PATENT DOCUMENTS

| | | | |
|---|---|---|---|
| 5,124,961 A | 6/1992 | Yamaguchi et al. | |
| 5,361,242 A * | 11/1994 | Chaya et al. | ............. 369/13.17 |
| 5,615,203 A | 3/1997 | Fukakusa | |
| 5,696,372 A | 12/1997 | Grober et al. | |
| 5,808,973 A | 9/1998 | Tanaka | |
| 5,881,042 A | 3/1999 | Knight | |

(Continued)

FOREIGN PATENT DOCUMENTS

JP        04064913 A   *   2/1992

(Continued)

OTHER PUBLICATIONS

H. Saga, et al.; New Recroding Method Combining Thermo-Magnetic Writing and Flux Detection; Journal; Mar. 1999; 1839-1840; vol. 38; Japanese Journal of Applied Physics.

(Continued)

*Primary Examiner*—William J Klimowicz
(74) *Attorney, Agent, or Firm*—Antonelli, Terry, Stout & Kraus, LLP.

(57) ABSTRACT

In order to prevent deterioration of floating characteristics of a slider due to deformation of a slider floating surface by thermal expansion of a coil, the followings are performed. A recessed portion is formed in a part of the slider, and a device for generating an optical near-field and the coil for generating a magnetic field are formed in the recessed portion. The optical near-field generation device is formed on a surface facing a recording medium, and the magnetic field application coil is formed on an upper surface of the recessed portion. The optical near-field generation device and the magnetic field application coil are respectively exposed to the surface.

4 Claims, 16 Drawing Sheets

U.S. PATENT DOCUMENTS

| | | | |
|---|---|---|---|
| 6,160,769 A | 12/2000 | Ohnuki et al. | |
| 6,333,900 B1 | 12/2001 | Maro et al. | |
| 6,407,884 B1 | 6/2002 | Osborne et al. | |
| 6,448,543 B1 | 9/2002 | Mitsuoka et al. | |
| 6,529,448 B1 | 3/2003 | Ishii et al. | |
| 6,584,045 B1* | 6/2003 | Ishii et al. | 369/13.23 |
| 6,649,894 B2 | 11/2003 | Matsumoto et al. | |
| 6,714,370 B2 | 3/2004 | McDaniel et al. | |
| 6,738,338 B1 | 5/2004 | Maeda et al. | |
| 6,768,556 B1 | 7/2004 | Matsumoto et al. | |
| 6,781,926 B2* | 8/2004 | Ishizaki et al. | 369/13.13 |
| 6,886,238 B2 | 5/2005 | Song et al. | |
| 6,949,732 B2 | 9/2005 | Kiguchi et al. | |
| 7,027,269 B2* | 4/2006 | Penning et al. | 360/317 |
| 7,054,234 B2 | 5/2006 | Saga et al. | |
| 7,127,729 B2* | 10/2006 | Kawasaki et al. | 720/671 |
| 7,154,820 B2* | 12/2006 | Nakada et al. | 369/13.32 |
| 2001/0004348 A1* | 6/2001 | Ueyanagi | 369/118 |
| 2002/0006102 A1 | 1/2002 | Durnin et al. | |
| 2002/0031056 A1* | 3/2002 | Penning et al. | 369/13.56 |
| 2002/0097639 A1* | 7/2002 | Ishizaki et al. | 369/13.13 |
| 2002/0101673 A1* | 8/2002 | Wickramasinghe et al. | 360/59 |
| 2002/0181337 A1* | 12/2002 | Takao et al. | 369/13.14 |
| 2003/0016615 A1* | 1/2003 | Lee et al. | 369/112.24 |
| 2003/0128633 A1* | 7/2003 | Batra et al. | 369/13.32 |
| 2003/0128634 A1* | 7/2003 | Challener | 369/13.33 |
| 2004/0001394 A1* | 1/2004 | Challener et al. | 369/13.32 |
| 2004/0202054 A1 | 10/2004 | Hesselink et al. | |
| 2005/0018547 A1 | 1/2005 | Akiyama et al. | |
| 2006/0114590 A1 | 6/2006 | Hamaguchi et al. | |

FOREIGN PATENT DOCUMENTS

| | | | |
|---|---|---|---|
| JP | 04076844 A | * | 3/1992 |
| JP | 08235663 A | * | 9/1996 |
| JP | 11-288537 A | | 10/1999 |
| JP | 2000173123 A | * | 6/2000 |
| JP | 2000276806 A | * | 10/2000 |
| JP | 2003051144 A | * | 2/2003 |
| JP | 2004-005858 | | 1/2004 |

OTHER PUBLICATIONS

T. Matsumoto, et al.; An Efficient Probe with a Planar Metallic Pattern for High-Density Near-Field Optical Memory; p. 55; Central Research Laboratory, Hitachi, Ltd.; Japan.

R. Thornton; Ultrahigh Light Transmission through a C-Shaped Nanoaperture; Journal; Aug. 1, 2003; 1320-1322; vol. 28, No. 15; Optical Society of America; United States.

English Machine Translation of JP 2004-005858.

English Machine translation of Awano et la. (KP 11-288537 A), published Oct. 19,1999.

English Machine translation of Awano et al. (JP 11-288537 A), published Oct. 19, 1999.

* cited by examiner

THERMALLY ASSISTED MAGNETIC RECORDING HEAD AND METHOD OF MANUFACTURING THE SAME

CROSS REFERENCE TO RELATED APPLICATION

This application is a Continuation of U.S. application Ser. No. 11/341,659, filed Jan. 30, 2006 (now abandoned), which claims priority from U.S. Patent Application Japanese application JP 2005-108835 filed on Apr. 5, 2005, the contents of which is hereby incorporated by reference.

FIELD OF THE INVENTION

The present invention relates to a thermally assisted magnetic recording head and a method of manufacturing the same.

BACKGROUND OF THE INVENTION

In the recent years, a thermally assisted magnetic recording method has been proposed as a recording method to realize a recording density of not less than 1 Tb/in$^2$ (H. Saga, H. Nemoto, H. Sukeda, and M. Takahashi, Jpn. J. Appl. Phys. 38, Part 1, 1839 (1999)). With conventional magnetic recording apparatuses, when the recording density is not less than 1 Tb/in$^2$, there is a problem of disappearance of recorded data due to a thermal fluctuation. It is necessary to increase coercivity of a medium in order to prevent the disappearance; however, because there is a limit in the magnitude of magnetic field that can be generated, it is impossible to form recording bits in the medium when coercivity is increased too much. In order to solve the problem, in the thermally assisted magnetic recording method, the medium is heated by a light at the moment of recording, whereby coercivity is decreased. Herewith, recording on a high coercivity medium is possible, making it possible to realize the recording density of not less than 1 Tb/in$^2$.

In a thermally assisted magnetic recording apparatus, it is necessary to make a spot diameter of a light to be irradiated approximately the same size (a few tens nanometers) as that of the recording bit. Because when the diameter is larger than that, the data of the adjacent truck is deleted. For heating such micro regions, an optical near-field is used. The optical near-field is a localized electromagnetic field present near a micro object which dimension is less than a light wavelength (a light which wave number has imaginary components) and is generated using a small aperture or a metal scatterer with a diameter of less than the light wavelength. For example, in "Technical Digest of 6th international conference on near field optics and related techniques, the Netherlands, Aug. 27-31, 2000, p 55", an optical near-field generator using a triangular shaped metal scatterer is proposed as a high-efficiency optical near-field generator. When a metal scatterer is illuminated by light, a plasmon is excited within the metal scatterer and a strong optical near-field is generated at the apex of the triangle. The Use of this optical near-field generator makes it possible to gather the light high-efficiently in the region of less than a few tens nanometers.

[Non-patent document 1] Jpn. J. Appl. Phys. 38, Part 1, 1839 (1999)

[Non-patent document 2] Technical Digest of 6th international conference on near field optics and related techniques, the Netherlands, Aug. 27-31, 2000, p 55

SUMMARY OF THE INVENTION

To realize the recording density of not less than 1 Tb/in$^2$ in the aforementioned thermally assisted magnetic recording apparatus, an anisotropic magnetic field ($H_k$) of the medium of more than 15 kOe is necessary to inhibit the thermal fluctuation of the medium. The $H_k$ can be lowered by application of heating by a light irradiation utilizing a magnetooptical medium such as a TbFeCo medium. However, even in such a case, the magnetic field of more than 1 kOe is necessary. In order to generate a magnetic field so that a magnetic field application position overlaps with the light spot position, it is necessary to form a magnetic coil such as a coil used in conventional magnetooptical disks in the periphery of the optical near-field generation device. However, for generation of a high magnetic field of not less than 1 kOe, it is necessary to arrange the coil as near to the medium as possible. For that purpose, it is necessary to form the coil at the bottom face of a floating slider. However, when such a structure is formed at the bottom face of the slider, the coil is expanded by heat generated by an electric current flow through the coil and the slider-floating surface is deformed. For realization of the recording density of not less than 1 Tb/in$^2$, it is necessary to make the floating quantity of the slider less than 10 nm. However, such a deformation deteriorates the floating characteristics, causing it very difficult to realize the floating quantity of less than 1 Tb/in$^2$. When the coil is formed at the bottom face of the floating slider, the heat from the coil is transmitted into the medium, and there is a possibility of heating of the medium over a wide range.

The purpose of the present invention is to reduce the effects of heat generation of the coil in a head for the thermally assisted The purpose is achieved by implementation of the constitution hereunder. In other words, forming a recessed portion on a part of the slider, which is the matrix of the head, the device for generating an optical near-field and the coil for generating a magnetic field are formed in a recessed portion. For example, an optical near-field generation device is formed on the surface facing a recording medium, and a magnetic field application coil, on the upper surface of the recessed portion. Herein, the upper surface of the recessed portion means the inside of the thinned-out portion of the recessed portion, the underside surface of the surface facing the recording medium. For the optical near-field generation device, a triangle, a rectangle, or oval, metal scatterer or a c-shaped or v-shaped aperture is used, and each of the optical near-field generation device and the magnetic field application coil is exposed to the surface. The thinned-out portion of the recessed portion comprises a material having an optical transparency, and the incident light is made enter from the upper surface of the recessed portion. When the magnetic field application coil is thus formed, because the coil is expanded in the direction of the upper surface of the recessed portion even when the coil is expanded by the heat generation of the coil, the effects on the floating quantity can be reduced. Because the slider exists in the space between the coil and the medium, the heat of the coil is hard to be transmitted to the medium.

For the substrate of the slider, a substrate comprising two layers of different materials such as surface oxide film silicon is used, and the thinned-out portion on the recessed portion can be the one layer among the two layers. To strengthen the strength of a magnetic field, a magnetic pole made of a soft magnetic material can be arranged in the inside of the coil.

For improvement of the heat dissipation of the coil, a heatsink layer can be provided on the upper surface of the recessed portion. Herein, the heatsink layer means a film of a material which thermal conductivity is higher than that of the material comprising the slider. Thus, by forming the heatsink on the upper surface of the recessed portion, the heat generated by the coil can be easily transmitted to the upper surface of the recessed portion and the temperature can be much lowered. The heatsink layer as this also possesses the effects of dissipation of the heat generated by the optical near-field generation device.

According to the present invention, the effects of heat generation of the coil can be reduced in the head for the thermally assisted magnetic recording.

BRIEF DESCRIPTION OF THE DRAWINGS

FIGS. 3A to 3D are cross sectional views showing the shapes of an optical near-field generation device of the present invention in which FIG. 3A shows a triangular shaped metal scatterer; FIG. 3B shows a combination of two triangular shaped metal scatterers, FIG. 3C shows a rectangle or oval shaped metal scatterer, and FIG. 3D shows a c-shaped or v-shaped aperture;

FIG. 9A shows a case when the thickness of the coil is the same as that of the thinned-out part of the recessed portion, and FIG. 9B shows a case when the thickness of the coil is thinner than that of the thinned-out part of the recessed portion;

FIGS. 12A to 12C are diagrams showing the position and dimensions of the magnetic pole formed in the inside of the coil in which FIG. 12A shows a case when the magnetic field overlaps with the point of generation of the optical near-field, FIG. 12B shows a case when the magnetic field deviates from the point of generation of the optical near-field, and FIG. 12C shows a case when the thickness of the magnetic pole is smaller than that of the coil;

FIGS. 13A and 13B are diagrams showing the head using a hollow magnetic pole in which FIG. 13A shows a top view, and FIG. 13B shows a cross sectional view;

FIG. 16A shows a case when the thickness of the coil is smaller than the depth of the cannel, and FIG. 16B shows a case when the lens is fixed utilizing the side surface of the recessed portion;

FIGS. 17A to 17E are diagrams showing the manufacturing method of the head of the present invention in which FIG. 17A shows the substrate before fabrication, FIG. 17B shows the etching step of the upper surface oxide film, FIG. 17C shows the step of forming the recessed portion, FIG. 17D shows the step of forming the optical near-field generation device, and FIG. 17E shows the step of forming the coil and the magnetic pole;

FIG. 18A shows a top view, and FIG. 18B shows a side view;

FIGS. 19A and 19B are diagrams showing the head in which a semiconductor laser, a collimating lens, a mirror, and a condenser lens are integrated in which FIG. 19A shows a side view and FIG. 19B shows a perspective view;

FIGS. 21A to 21C are diagrams showing the head in which a optical fiber, a collimating lens, a mirror, and a condenser lens are integrated in which FIG. 21A shows a side view, FIG. 21B shows a perspective view, and FIG. 21C shows a mounting drawing of a fiber.

DETAILED DESCRIPTION OF THE PREFERRED EMBODIMENTS

Figure 1:
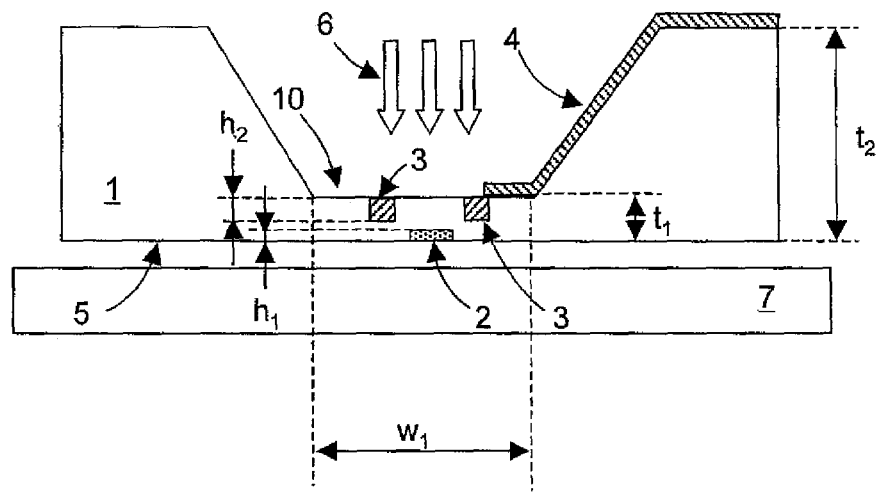
FIG. 1 is a diagram showing a thermally assisted magnetic recording head of the present invention.

In the head for the thermally assisted magnetic recording apparatus of the present invention, as shown in FIG. 1, a recessed portion 10 is formed in a part of a slider 1 which is the matrix of a head, and a device 2 to generate the optical near-field and the coil 3 to generate the magnetic field are formed on the recessed portion. The optical near-field generation device 2 is formed on the surface facing a recording medium 7 and the magnetic field application coil 3 is formed as embedded in the upper surface of the recessed portion. Herein, the upper surface of the recessed portion means the inside of the thinned-out portion of the recessed portion, the underside surface of a surface 5 facing the recording medium 7. Each of the optical near-field generation device 2 and the magnetic field application coil 3 is exposed to the surface. The thinned-out portion of the recessed portion 10 comprises a material having an optical transparency, and an incident light 6 is made enter from the upper surface of the recessed portion. When the magnetic field application coil 3 is thus formed, because the coil is expanded in the direction of the upper surface of the recessed portion even when the coil is expanded by the heat generation of the coil, the effects on the floating quantity can be reduced. Because the slider 1 exists in the space between the coil and the medium, the heat of the coil is hard to be transmitted to the medium.

Figure 2:
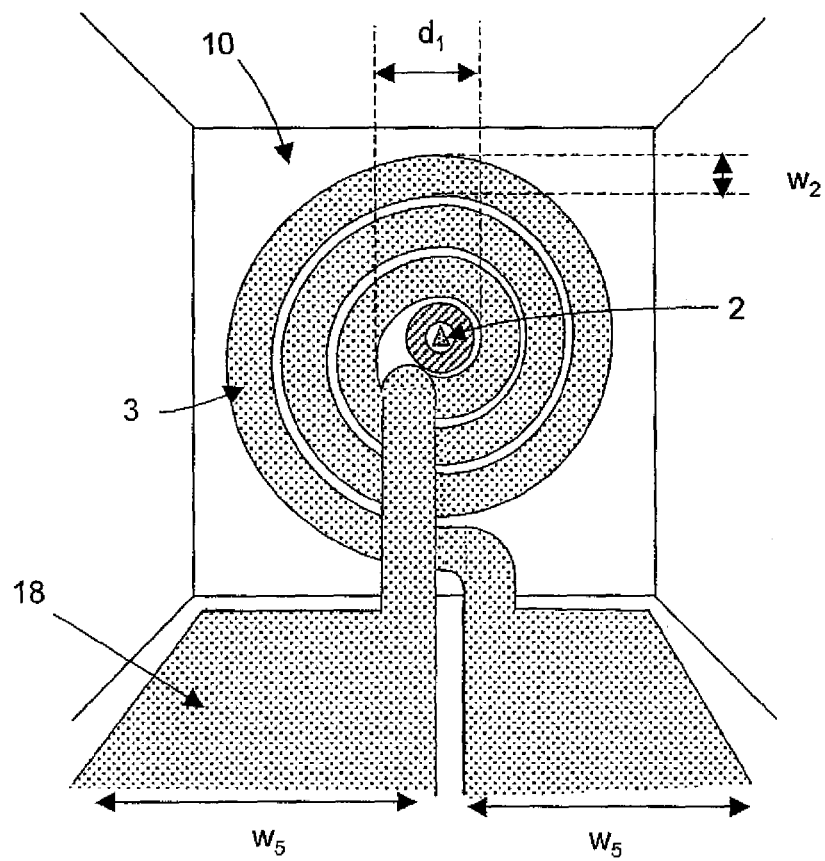
FIG. 2 is a diagram showing a coil shape formed on the upper surface of a recessed portion of the present invention.
Figure 3:
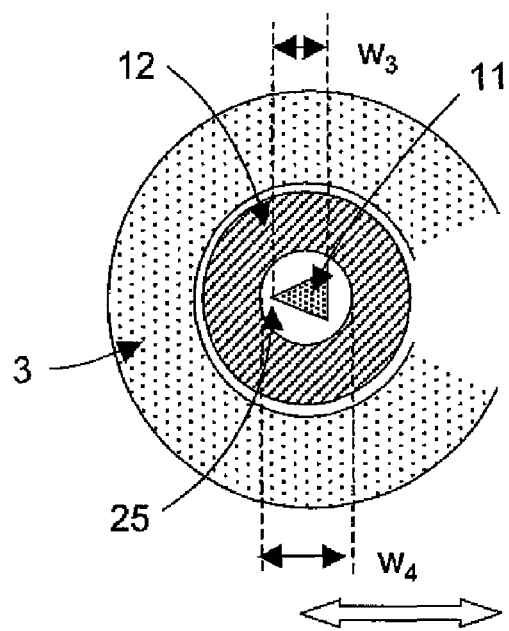
Figure 3:
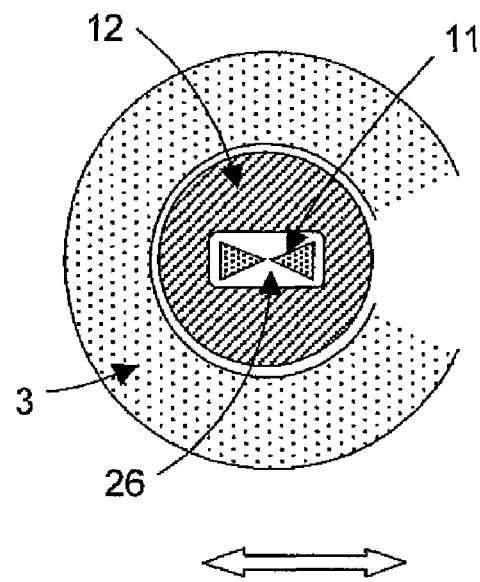
Figure 3:
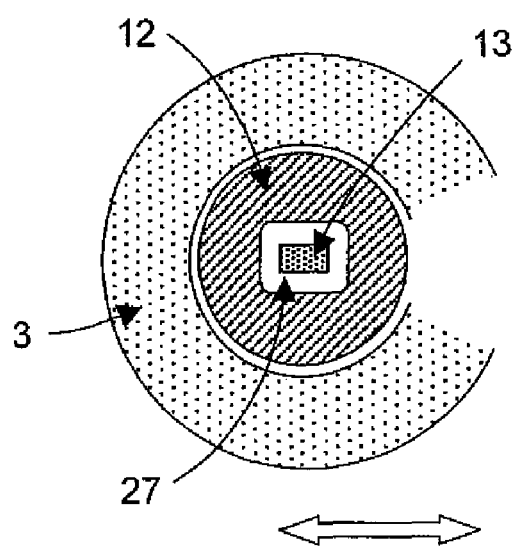
Figure 3:
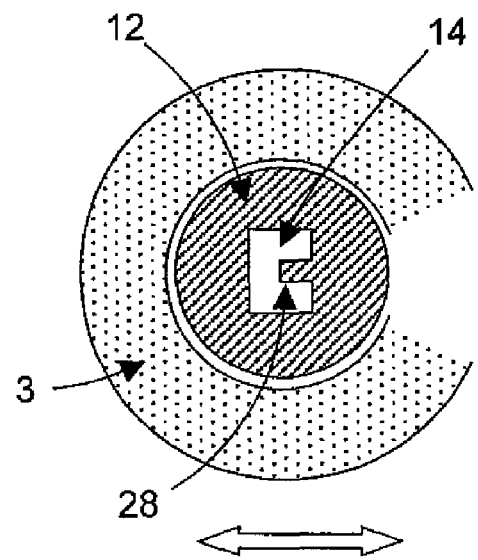

In the present embodiments, using a piece of quartz for the slider substrate, the recessed portion is formed on a part therein. For the coil, a scroll-like coil made of copper is used as shown in FIG. 2. The height h2 of the coil is made 1 μm, the width w2 is made 1 μm, and the inside diameter d1 is made 3 μm. As shown in FIG. 1, an interconnection 4 of the coil is formed on the upper surface of the slider (the surface opposite to a surface 5 facing the medium). In the head of the present invention, because the interconnection can be formed on the upper surface of the slider, the interconnection cannot be an obstacle for the floating. The optical near-field generation device 2 is arranged in the central part of the coil 3. In the present embodiments, for the optical near-field generation device, a triangular shaped scatterer 11, as shown in FIG. 3A, is used. In this instance, when a light polarized in the direction indicated by the arrow in the figure is made enter, a strong optical near-field is generated at a apex 25 of the triangle. In the present embodiments, the material of the triangle is gold, with 100 nm in the width w3 and 50 nm in the thickness h1, and the vertical angle of the apex 25 is made 40-degree and the wavelength of the incident light is made 780 nm. In the periphery of the scatterer, a light shielding film 12 is formed to prevent a background light from entering into the medium. The material of the light shielding film is gold, with 50 nm in the width, and the opening size w4 of the central portion is made 300 nm. As shown in JP-A No. 151046/2004, a part of the surface of the triangle can be recessed.

The thickness $t_2$ of the slider 1 needs to be thickened to the degree where an unnecessary warping is not generated on the slider floating surface. For that purpose, it is desirable to have the thickness $t_2$ not less than 0.2×x when the length of the wide side of the slider is made x. In the present embodiments, when the dimension of the slider is made 1.25 mm×1 mm, the thickness $t_2$ is made 0.3 mm. When the dimension of the slider is made 0.85 mm×0.7 mm, the thickness $t_2$ is made 0.23 mm. As for the thickness $t_1$ of the thinned-out portion of the recessed portion, it is required to be as thin as possible to strengthen the magnetic field strength reaching the medium surface. However, when it is made too thin, the recessed portion is destroyed, and so, the thickness has need to be not less than a certain thickness to keep a sufficient strength. For example, as shown in FIG. 1, when embedding the coil 3 in the thinned-out portion of the recessed portion, it is desirable to make the thickness $t_1$ not more than "the coil thickness $h_2$+1 μm" in order to obtain a sufficient magnetic field strength. In order to keep a sufficient strength, it is desirable to make the thickness $t_1$ not less than "the width $w_1$ of the recessed portion×0.01". In the present embodiments, the $w_1$ is made 70 μm, the coil thickness $h_2$, 1 μm, and the thickness $t_1$ of the recessed portion, 1.25 μm.

For the optical near-field generation device, a unit, as shown FIG. 3B, in which two triangle scatterers faces each other, can be used. In this instance, when a light polarized in the direction indicated by the arrow in the figure is made enter, a strong optical near-field is generated in a peak-to-peak space 26 of the two triangles. As shown in FIG. 3C, a rectangular or oval scatterer 13 can be used. In this instance, when a light polarized in the long axis direction (the direction of the arrow) is made enter, a strong optical near-field is generated at an end 27 on the long axis. As shown in FIG. 3D, the c-shaped aperture 14 (X. Shi, L. Hesselink, and R. L. Thornton, Opt. Lett. Vol. 2, p 1320, 2003) and the v-shaped aperture (U.S. Pat. No. 6,768,556B1, FIG. 2F) can be used. In this instance, when a light polarized in the direction of the arrow is made enter, a strong optical near-field is generated at a apex 28 in the center.

For the number of turns and the inside diameter $d_1$ of the magnetic field application coil, an adjustment can be made in accordance with the required magnetic field (the required magnetic field depends on the medium to be used), and when a sufficient magnetic field strength can be obtained, even one turn is acceptable. On the contrary, when the coil of one turn is insufficient, the coil can be of piling up in some number of layers.

Figure 4:
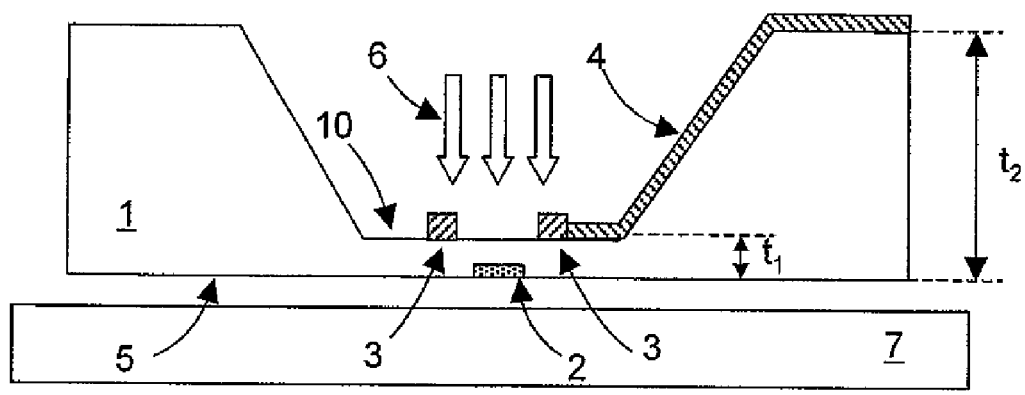
FIG. 4 is a diagram showing a head arranged so that a coil is not embedded in the upper surface of the recessed portion but placed thereon.

The magnetic field application coil can be formed on the upper surface of the recessed portion as shown in FIG. 4 instead of embedding the coil in the upper surface of the recessed portion. When the coil is formed in this manner, a transverse strain applied to the thinned-out portion of the recessed portion is reduced when the coil is expanded transversely (the direction parallel to the medium surface).

In order to decrease the temperature of the magnetic field application coil, the width of a root 18 of the interconnection part can be thickened as shown in FIG. 2. Hereby, the interconnection part works as a heatsink, decreasing the temperature. In the present embodiments, the width $w_5$ of the root of the interconnection is made 100 μm.

Figure 5:
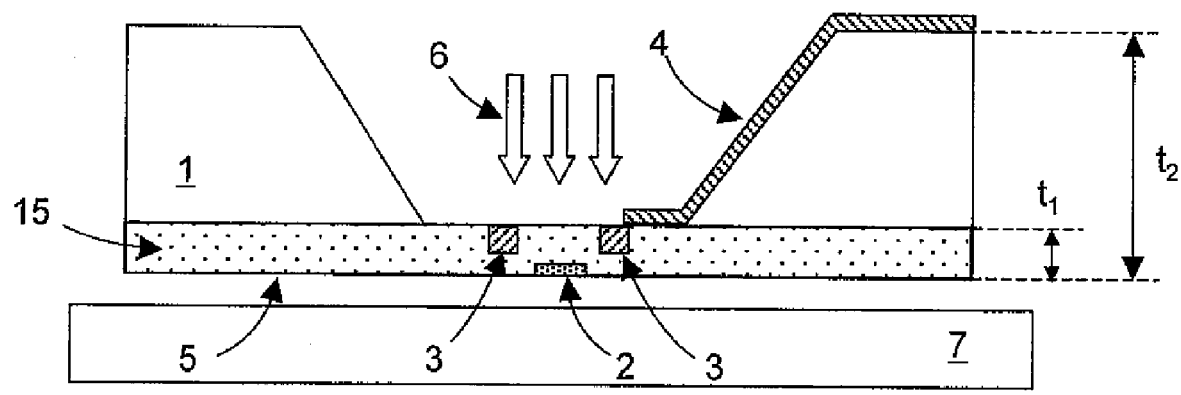
FIG. 5 is a diagram showing a head using a substrate comprising two layers of different materials for a slider substrate.
Figure 6:
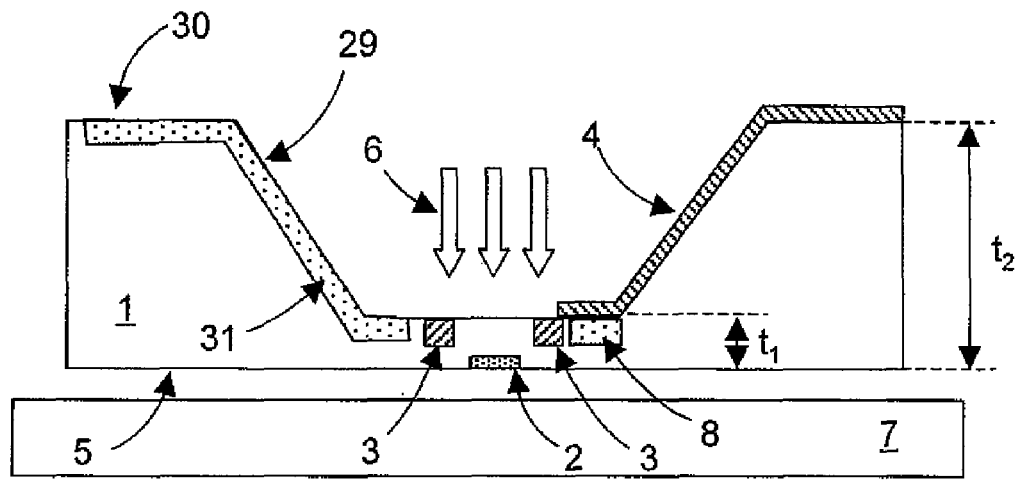
FIG. 6 is a diagram showing a head in which a heatsink layer is formed on the upper surface of the recessed portion.

For the substrate to be used for the slider 1, as shown in FIG. 5, a substrate comprising two layers of different materials can be used. In the present embodiments, a Si substrate with a surface oxide film is used so that the layer of the oxide film is a layer 15 on the surface facing the medium 7. The formation is made so that the thinned-out portion of the recessed portion is an entire layer of the oxide film and the optical near-field generation device 2 and the magnetic field application coil 3 are embedded in the layer 15 of the oxide film of the surface. The thickness $t_2$ of the substrate is made 0.23 mm, and the thickness $t_1$ of the layer 15 of the oxide film, 1 μm. The substrate for use can be of any kind provided that the layer 15 of the surface has an optical transparency; for example, even a Si substrate with a surface nitride film can be used. The other acceptable substrates include those in which a transparent layer is deposited on the substrate surface by a sputtering equipment or a vacuum deposition system. For example, the substrates in which a material such as $Al_2O_3$, $Cr_2O_3$, $ZrO_2$, ZnS, $TiO_2$, $CeO_2$, SiN, SiO, DLC (diamond like carbon), $MgF_2$, MgO, $CaF_2$, or $BaF_2$ is deposited on the surface of the substrate is also acceptable.

For improvement of dissipation of the heat from the coil, a heatsink layer can be provided on the upper surface of the recessed portion. Herein, the heatsink layer means a film of a material which thermal conductivity is higher than that of the material comprising the slider 1. In the present embodiments, heatsink layers 8 and 31, with 1 μm in thickness, are formed on the upper surface of the recessed portion near the coil 3. The heatsink layer can be formed, as the heatsink layer 31, covering a side surface 29 of the recessed portion through an upper surface 30 of the slider. By forming like this, the area of the heatsink layer can be enlarged and the heat dissipation effects can be enhanced. The heatsink layer as this also has the heat dissipation effects on the heat generated by the optical near-field generation device 2.

Figure 7:
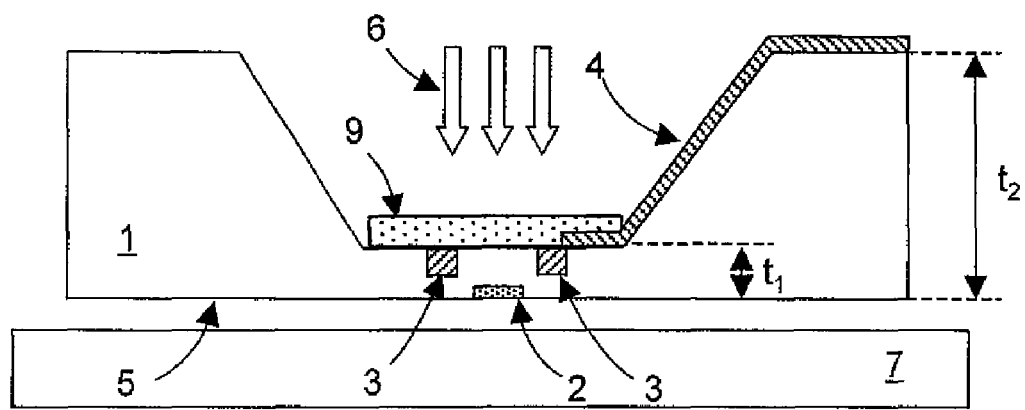
FIG. 7 is a diagram showing a head in which a heatsink layer having an optical transparency is formed on the upper surface of the recessed portion.

The heatsink layer can be formed as covering the portion of the upper surface of the recessed portion through which a incident light 6 passes as shown in FIG. 7. In this case, the material of a heatsink layer 9 is a material having an optical transparency. For example, the material includes $Al_2O_3$, $MgF_2$, MgO, or $Cr_2O_3$.

Figure 8:
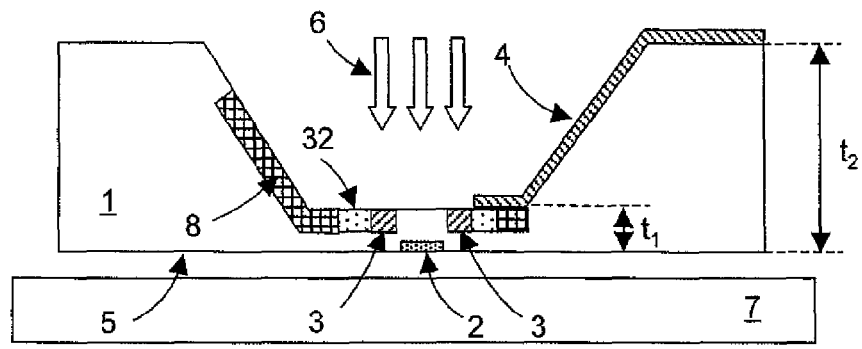
FIG. 8 is a diagram showing a head in which a space between the heatsink layer and the coil is filled with a material having high thermal conductivity.

When the heatsink layer 8 has an electric conductivity, the heatsink layer 8 needs to be separated from the coil 3. However, in order to increase the thermal conductivity between the heatsink layer 8 and the coil 3, as shown in FIG. 8, a gap between the heatsink layer 8 and the coil 3 can be filled in by a material 32 having an insulation property as well as a good thermal conductivity such as $Al_2O_3$, $MgF_2$ and MgO.

Figure 9:
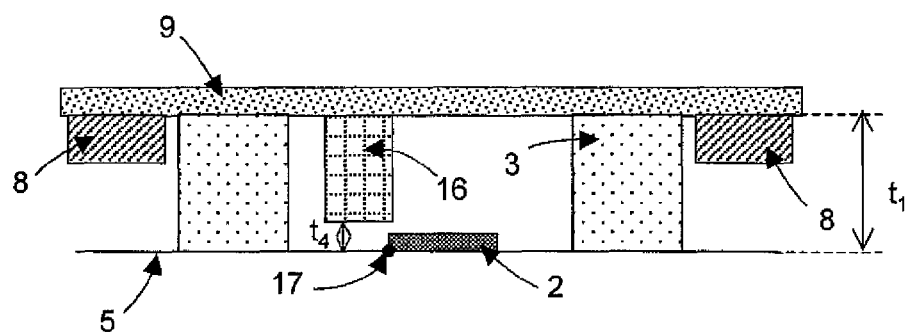
FIG. 9A and FIG. 9B are diagrams showing the head in which the coil is exposed to the surface side facing a medium.
Figure 9:
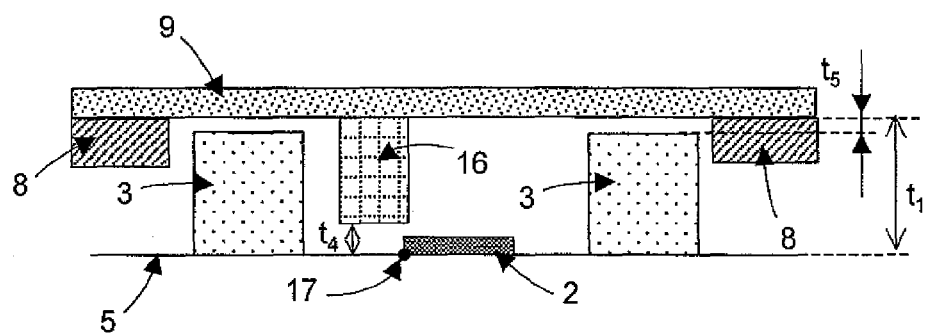

When providing the heatsink layer on the upper surface of the recessed portion, as shown in FIG. 9, the bottom of the coil 3 can be exposed from the bottom 5 of the slider. Because the heat generated by the coil is radiated through the heatsink layer in the direction of the upper surface of the recessed portion, the quantity of exposure of the coil on the slider floating surface 5 decreases.

Figure 10:
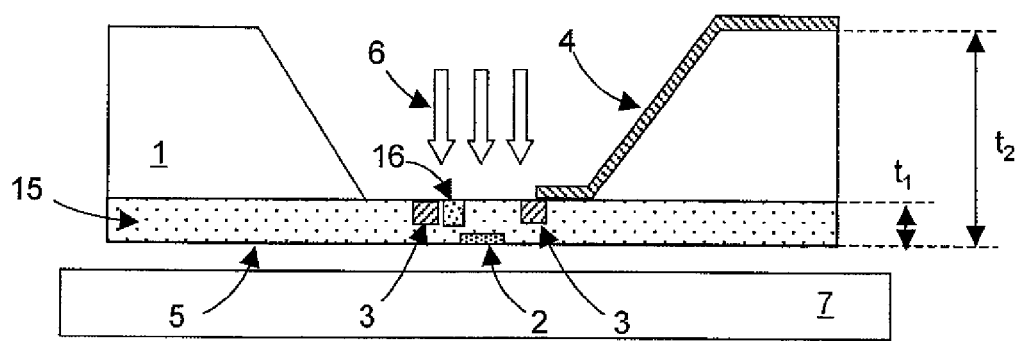
FIG. 10 is a cross sectional view of the head in which a magnetic pole is formed in the inside of the coil.
Figure 11:
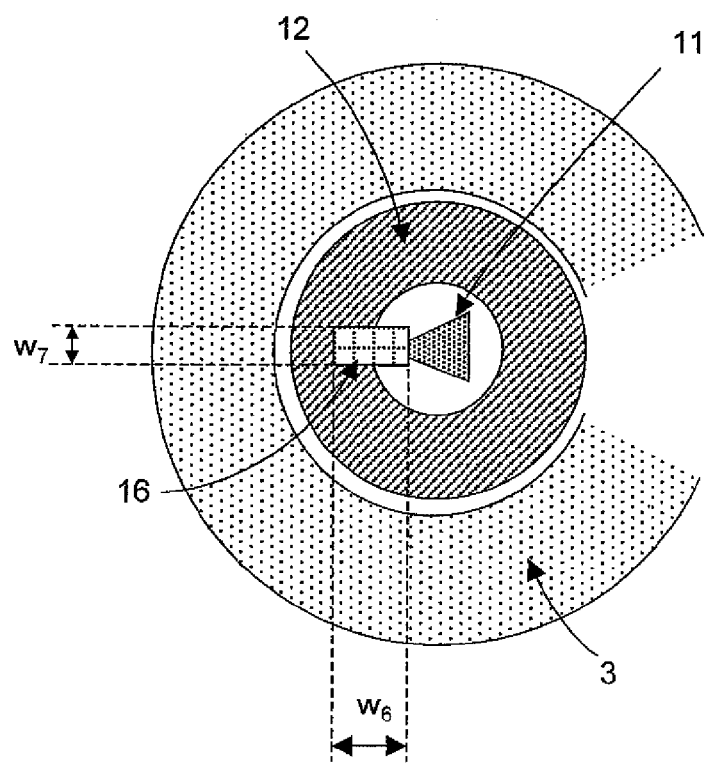
FIG. 11 is a top view of the head in which the magnetic pole is formed in the inside of the coil.
Figure 12:
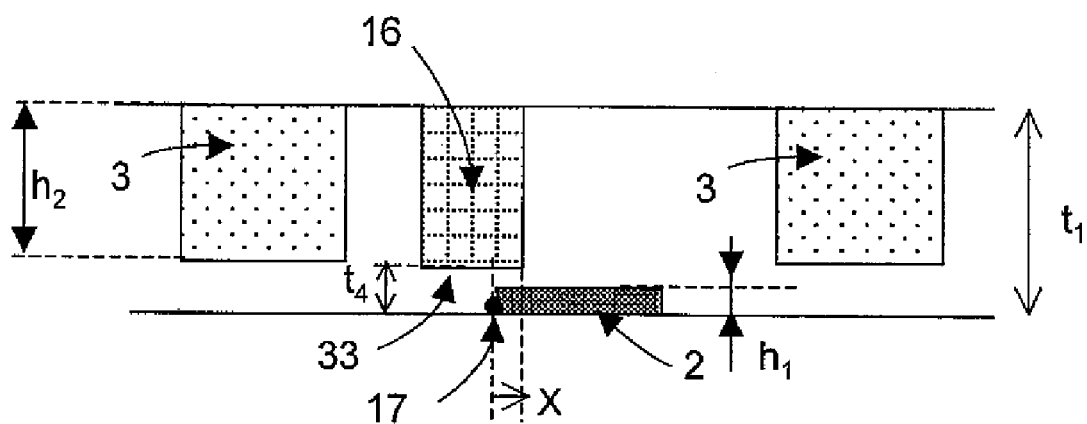
Figure 12:
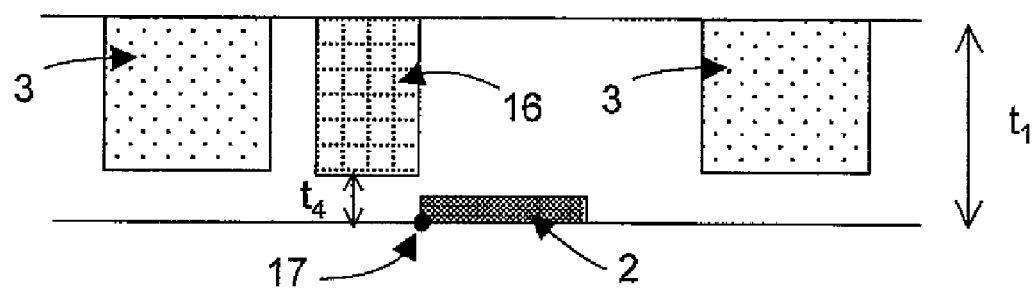
Figure 12:
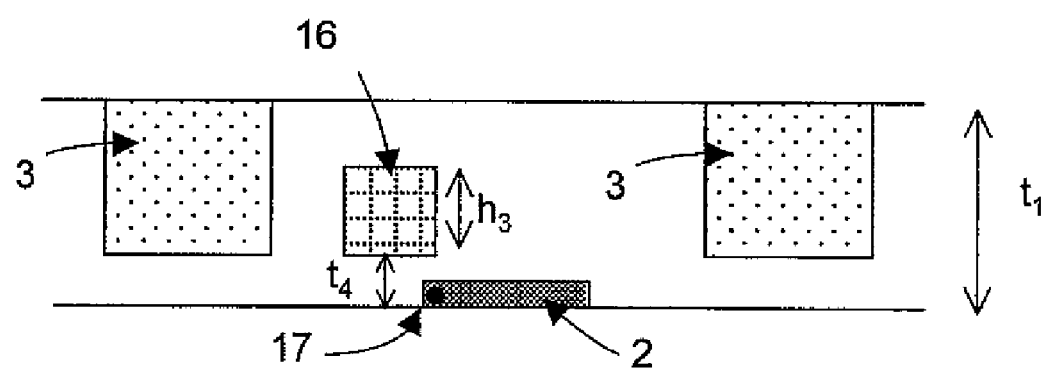

For strengthening the magnetic field strength, a magnetic pole 16 made of a soft magnetic material can be arranged in the inside of the coil as shown in FIG. 9 and FIG. 10. In the embodiment in FIG. 10, the optical near-field generation device, the magnetic field application coil, and the magnetic pole are formed on an oxide film layer 15 of the Si substrate with the surface oxide film. For the optical near-field generation device, the magnetic pole 16 of the soft magnetic body made of an FeCo alloy as shown in FIG. 11 is formed near a apex 25, in which the optical near-field is generated, using the triangular shaped scatterer 11 as shown in FIG. 3A. For a material of the magnetic pole, any material can be used so far as it is a soft magnetic body, and, for example, an FeNi alloy can be used. The thickness $t_1$ of the oxide film is made 1.2 μm, the thickness $h_1$ of the scatterer, 50 nm, and the thickness $h_2$ of the coil, 1 μm. The widths $w_6$ and the width $w_7$ of the magnetic pole 16 shown in FIG. 11 are made 100 nm and 50 nm respectively, and a distance $t_4$ between a magnetic pole bottom 33 and the head surface is made 80 nm. It is necessary to overlap the magnetic field distribution with the heating position. Accordingly, the magnetic pole 16 is arranged, as shown in FIG. 12A, to overlap with the optical near-field generation position 17. The overlapping quantity x is made 20 nm. When the area in which the magnetic field is distributed is larger than that of the magnetic pole bottom 33 (for example, the distance $t_4$ between the magnetic pole bottom 33 and the head surface becomes large), the magnetic pole 16 does not have to overlap with the optical near-field generation position 17 as shown in FIG. 12B. As shown in FIG. 12C, the height $h_3$ of the magnetic pole can be smaller than the thickness $h_2$ of the coil. In the present embodiments, the shape of the magnetic pole is made a square; it can be a column instead of the square pole.

Figure 13:
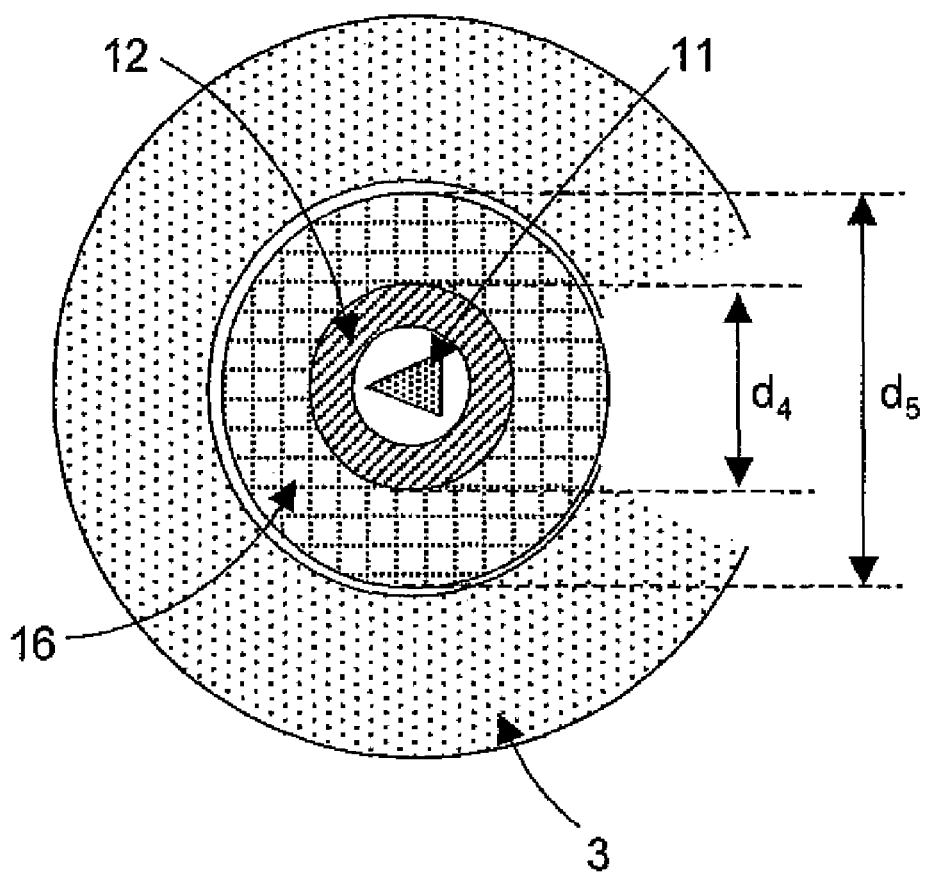
Figure 13:
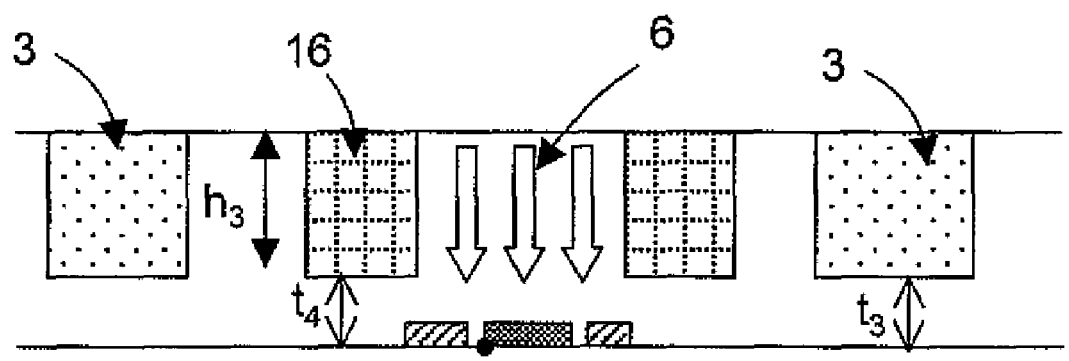

The magnetic pole can be arranged as surrounding the optical near-field generation device as shown in FIG. 13. In the present embodiments, the cylindrical hollow magnetic pole 16 is formed and the triangular shaped scatterer 11 is formed in the center thereof. An inside diameter $d_4$, an outside diameter $d_5$, and a height $h_3$ of the magnetic pole 16 are made 1.5 μm, 2.5 μm, and 1 μm each respectively, and the distance $t_4$ between the magnetic pole bottom and the slider surface is made 100 nm. In this instance, the shape of the magnetic pole can only be hollow-configured, and a unit can also be acceptable when a square aperture is formed in the square pole.

Figure 14:
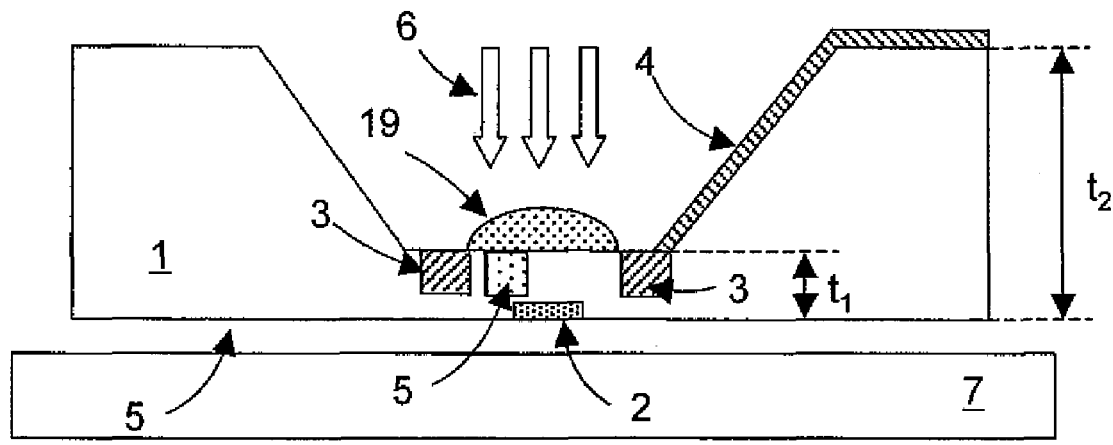
FIG. 14 is a diagram showing the head in which a condenser lens is formed on the upper surface of the recessed portion.

In order to have the incident light 6 efficiently converted in the optical near-field, it is necessary to focus the incident light 6 with a lens and arrange the optical near-field generation device 2 in the focus position. For that purpose, as shown in FIG. 14, a convex lens 19 can be arranged on the upper surface of the recessed portion. For the lens, a member which can focus light can be used, including, besides the convex lens, a gradient-index lens, a Fresnel lens, a ball lens, a solid immersion lens, and a solid immersion mirror. According to the invention, because the distance between the lens 19 and the optical near-field generation device 2 can be made smaller, it is possible to decrease the lens diameter. In the present embodiments, a convex microlens of 100 μm in diameter is used.

Figure 15:
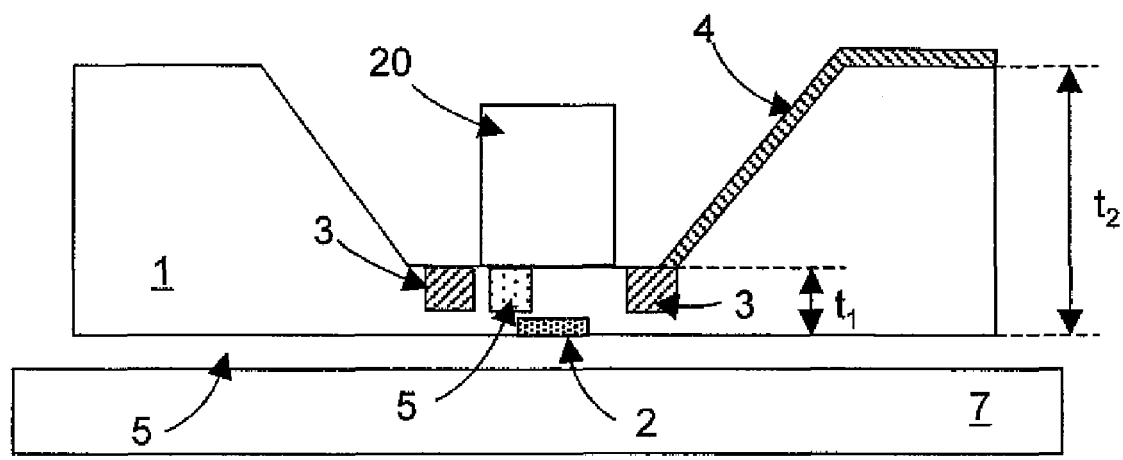
FIG. 15 is a diagram showing a semiconductor laser on the upper surface of the recessed portion.

Instead of condensing the incident light with a condenser lens, as shown in FIG. 15, a semiconductor laser 20 can be directly formed on the upper surface of the recessed portion. In this instance, the semiconductor laser 20 is installed so that the position of an exit aperture overlaps with the position of the optical near-field generation device.

Figure 16:
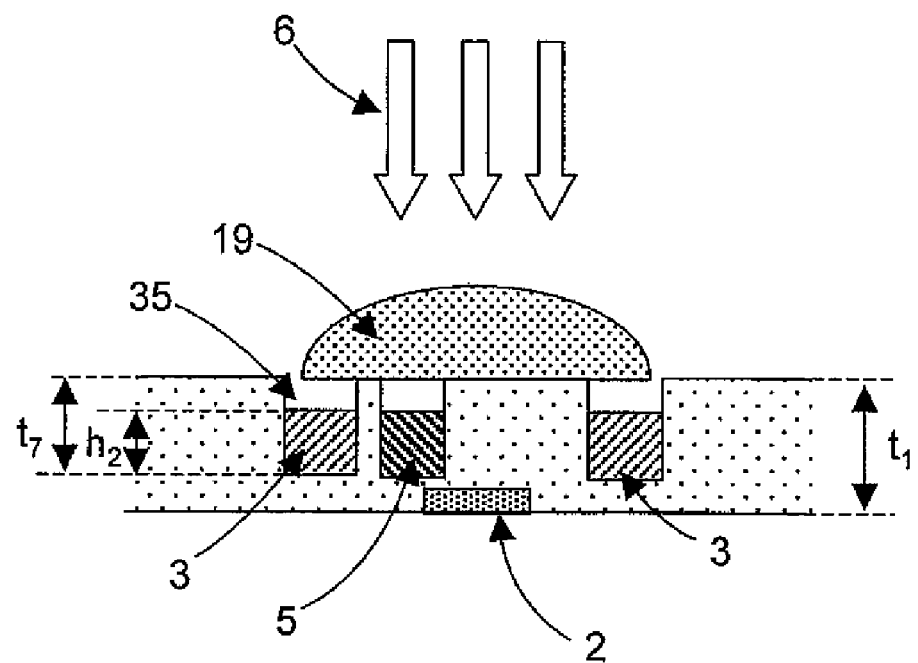
FIGS. 16A and 16B are diagrams showing the head in which a gap is provided between the coil and the lens.
Figure 16:
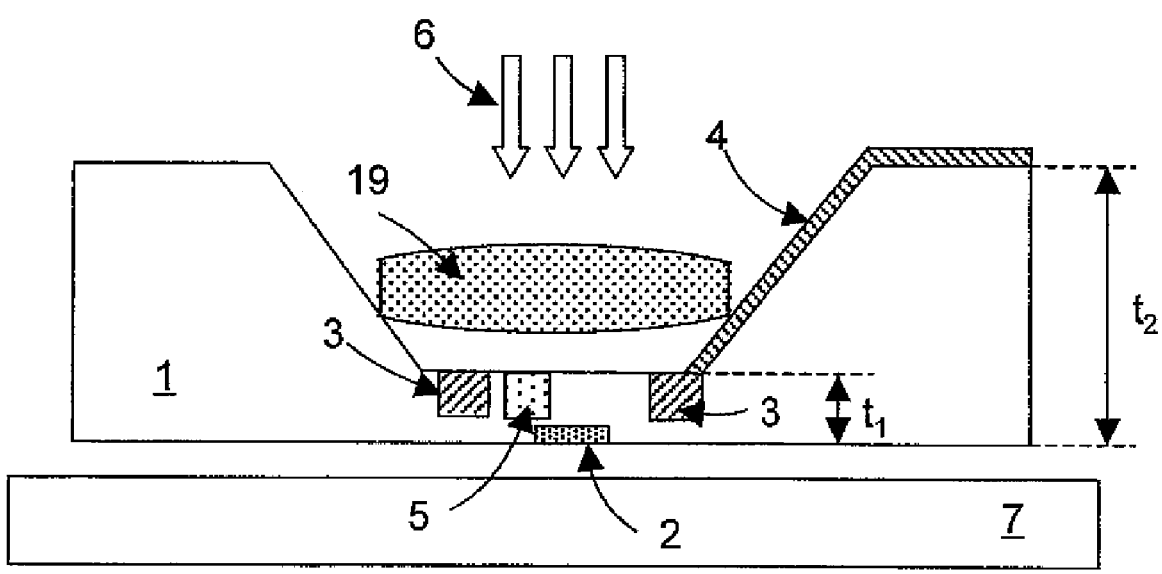

When an optical device such as a lens or a semiconductor laser is placed on the upper surface of the recessed portion, there is possibility of distortion of the lens due to the thermal expansion of the coil. To prevent the distortion, it is desired to create a space between the coil and the lens. For example, as shown in FIG. 16A, a coil-embedding recessed channel 35 is formed, and the coil 3 is formed therein. At this time, when a depth $t_7$ of a channel 35 is made larger than the height $h_2$, a space is created between the coil 3 and the lens 19. In the present embodiments, the channel depth $t_7$ is made 1.1 μm, and the height $h_2$ of the coil, 1 μm. As shown in FIG. 16B, a space can be provided by fixing the lens utilizing the side surface of the recessed portion.

Figure 17:
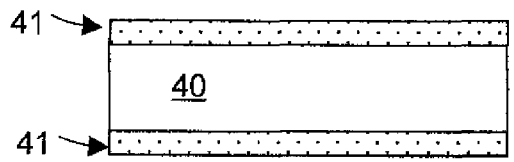
Figure 17:
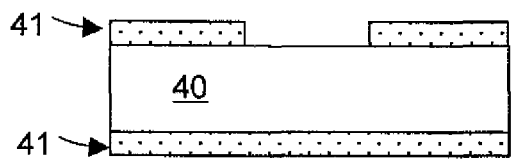
Figure 17:
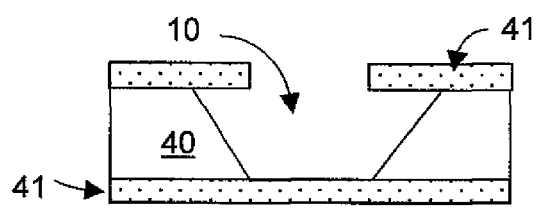
Figure 17:
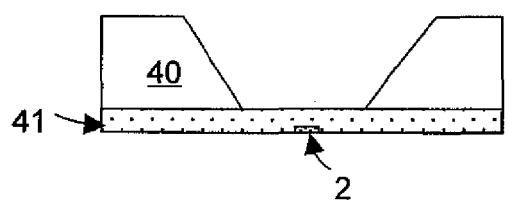
Figure 17:
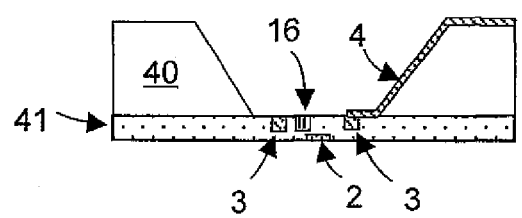

FIG. 17 shows the manufacturing method of the head of the present invention. In the present embodiments, a Si (100) surface substrate (the thickness 0.3 mm, the surface oxide film layer thickness 1.25 μm) 40 with oxide films on both sides is used as shown in FIG. 17A. Hereunder, details of each process are shown.

In the process as shown in FIG. 17B, an upper surface oxide film 41 in a part forming the recessed portion is removed by etching. First, a positive type photoresist is applied on the oxide film layer. The resist thickness is made 1 μm. Next, the part forming the recessed portion is exposed by an ultraviolet light (i-ray). In the present embodiments, the shape of the recessed portion is made square, and the length of a side of the exposure part, 70 μm. Next, the oxide film layer is etched using a reactive ion etching (RIE) equipment.

In the process as shown in FIG. 17C, the recessed portion is formed by etching the Si layer. In the present embodiments, the upper part oxide film layer is masked, and the Si layer 40 is etched (anisotropic etching) by an alkaline etching solution (KOH aquatic solution). At this time, because the etching rate of the surface oxide film layer is very slow in comparison with the etching rate of the Si layer, leaving the surface oxide film layer 41, the recessed portion 10 is formed. At the last, the upper part SiO$_2$ layer is removed by etching with the RIE equipment as well as removing the resist with a removing solution. At the time, the upper surface of the recessed portion is protected by a resist to prevent the lower part oxidized film layer from being etched.

In the process as shown in FIG. 17D, the optical near-field generation device is formed by an electron-beam lithography on the surface of a lower part oxide film layer 41. In the present embodiments, as the optical near-field generation device 2, a triangular shaped metal scatterer as shown in FIG. 3A is formed. First, an electron beam resist having the depth of 200 nm is coated on the lower part oxide film layer surface, and a part where the scatterer is formed is exposed by an electron-beam lithography system. Next, the exposed oxide film is etched by using the RIE equipment. The depth of etching is 50 nm. And then, gold having the depth of 50 nm is deposited on the etched part by vacuum deposition equipment, and at the last, the remaining electron beam resist is removed immersing in the removing solution (liftoff). In the present embodiments, the optical near-field generation device is formed after forming the recessed portion, but the recessed portion can be formed after forming the optical near-field generation device.

In the process as shown in FIG. 17E, the coil 3 and the magnetic pole 16 are formed on the upper surface of the recessed portion. First, a photoresist having the depth of 2 μm is coated on the upper surface of the recessed portion. Next, the part in which the coil is formed is exposed by the ultraviolet light (i-ray). At the time, because the surface oxide film layer 14 is transparent, alignment of the mask is made observing the optical near-field generation device from the direction of the upper surface of the recessed portion. At the time, for a resolution improvement, exposing can be made using the electron beam instead of the i-ray. Next, the oxide film layer of the part in which the resist is removed is etched using the RIE equipment. The depth of the channel formed by the etching is made 1 µm. Next, the coil part is formed depositing a metal film in the formed channel. In the present embodiments, copper of 1 µm is deposited utilizing the sputtering equipment or a gilding equipment, the magnetic pole 16 is formed by the same method as that of the coil formation. For the resist, an electron beam resist is used, and the exposure is made using the electron beam lithography system. For the material of the magnetic pole, the FeCo alloy is used, and for deposition of the magnetic pole material, the sputtering equipment is used.

Figure 18:
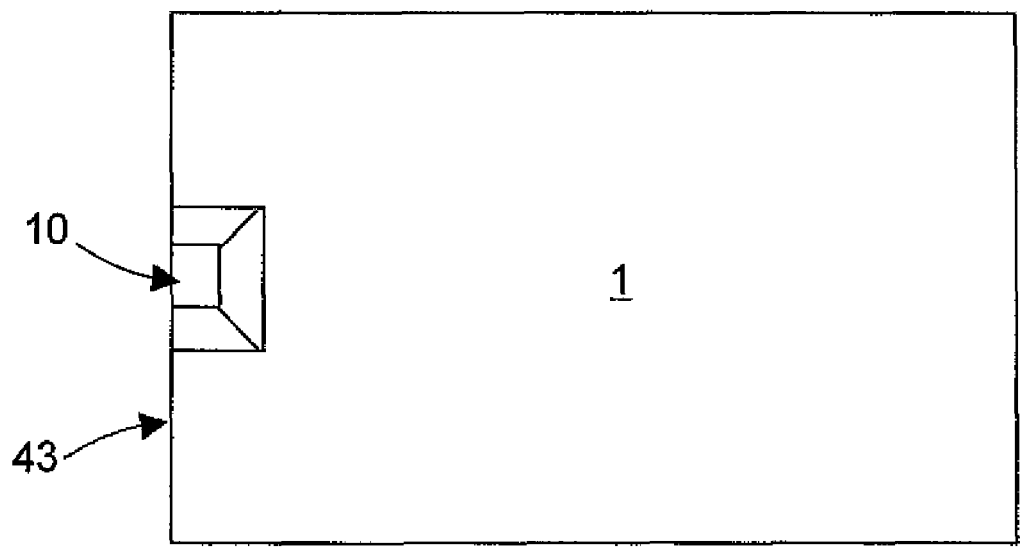
FIGS. 18A and 18B are diagrams showing the head in which a part of the side surface of the recessed portion is ground down.
Figure 18:
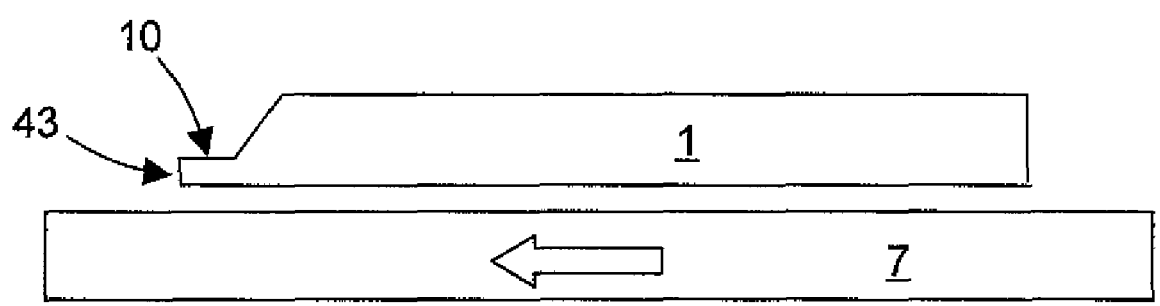

A part of the side surface of the recessed portion can be cut down as shown in FIG. 18A and FIG. 18B. In the floating slider, the floating quantity is minimized at an outflow end part. Thus by cutting down the side surface of the recessed portion, it becomes possible to reduce the distance between the optical near-field generation device and an outflow end 43 and the floating quantity can be reduced. In the present embodiments, a part of the recessed portion is cut down by dicing equipment after forming in the recessed portion the devices including the optical near-field generation device and the coil. For a cutting down method, instead of the dicing equipment, a polishing apparatus and chemical mechanical polishing (CMP) equipment can be used (the side surface of the slider is ground down).

Figure 19:
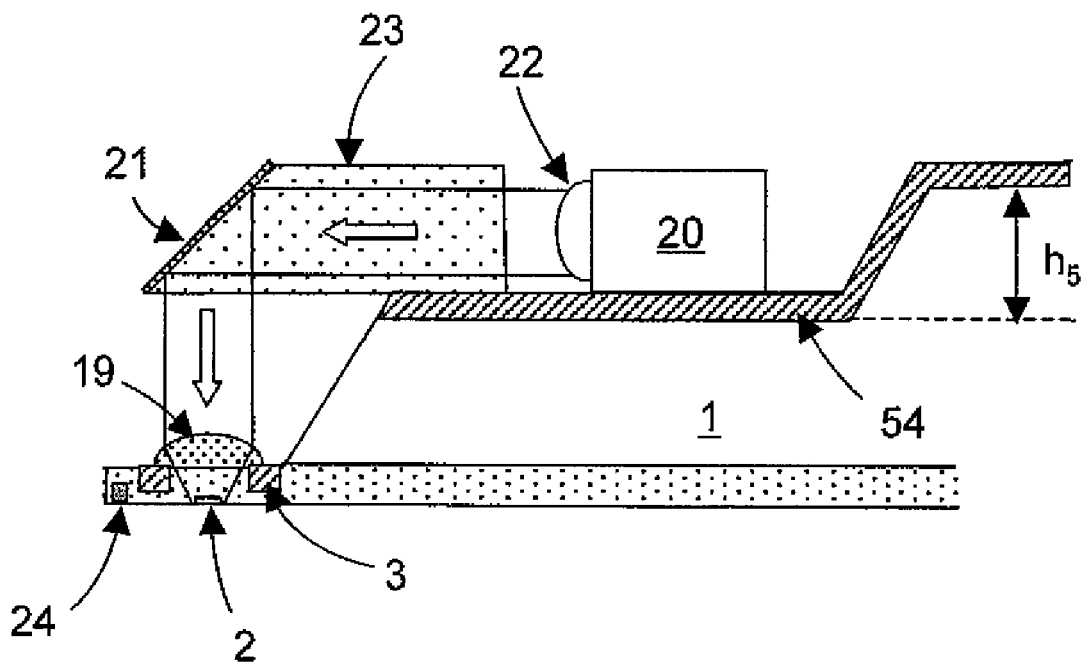
Figure 19:
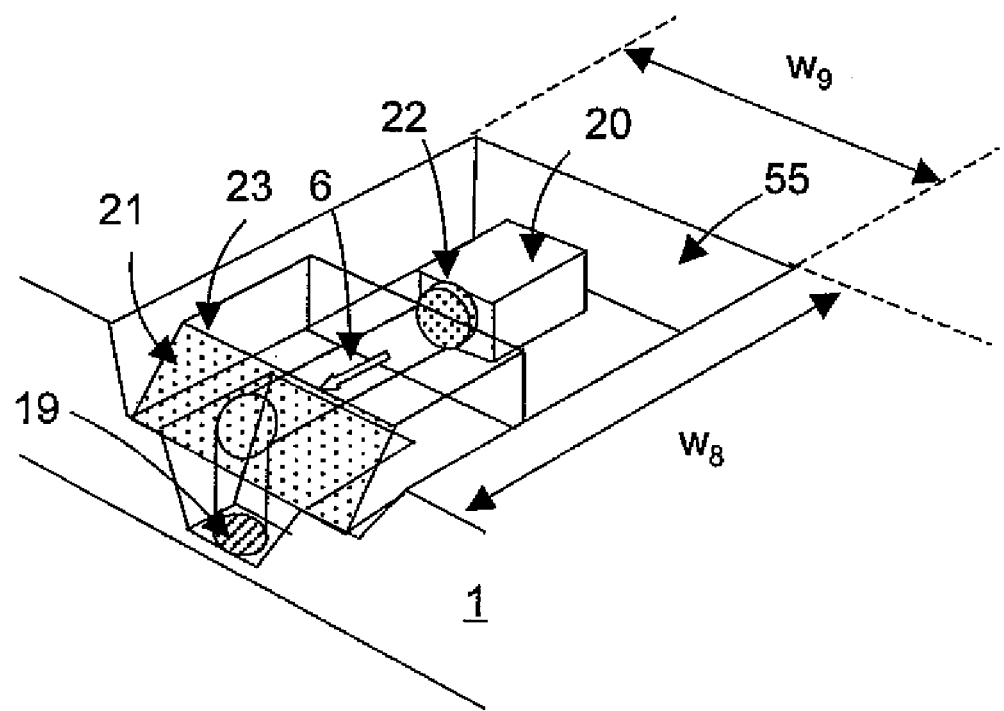

FIG. 19A and FIG. 19B show an embodiment of the head incorporated with the optical devices including a light source and a condenser lens. In the present embodiments, the recessed portion is formed at the outflow end side, and a part of the side surface of the recessed portion is cut down as shown in FIG. 18A and FIG. 18B. The light from the semiconductor laser 20 is collimated by a lens 22 and a light path is bent by a mirror 21 so that the light enters the condenser lens 19, which is formed on the upper surface of the recessed portion. Beneath the condenser lens, the coil 3 and the optical near-field generation device 2 are formed. For the collimating lens 22, a microlens with 100 µm in diameter is used and formed on the end surface of the laser 20. The mirror 21 is prepared from polishing the end surface of a glass substrate 23 in an angle of 45-degree and attached by an adhesive. The optical devices including the laser and the collimating lens are formed in a part 55 of the slider 1 which is dented so that the devices would not run against a suspension. The dent 55 is formed by the alkaline etching of Si the same as the process of forming the recessed portion as shown in FIG. 17B and FIG. 17C. The dent 55 is formed before the step of formation of the recessed portion of FIG. 17B. The dimensions of the dent 55 are $w_8=450$ µm, $w_9=150$ µm, and $h_5=120$ µm. For dissipation of the heat from the laser, a heatsink (a copper film) 54 is formed beneath the laser. The heatsink layer 54 is formed covering the upper surface of the slider for improvement of the heat dissipation effects. A magnetic reproducing device 24 for reproducing recorded data is formed near the optical near-field generation device. In the present embodiments, a giant magneto resistive (GMR) device is used as the magnetic reproducing device 24.

Figure 20:
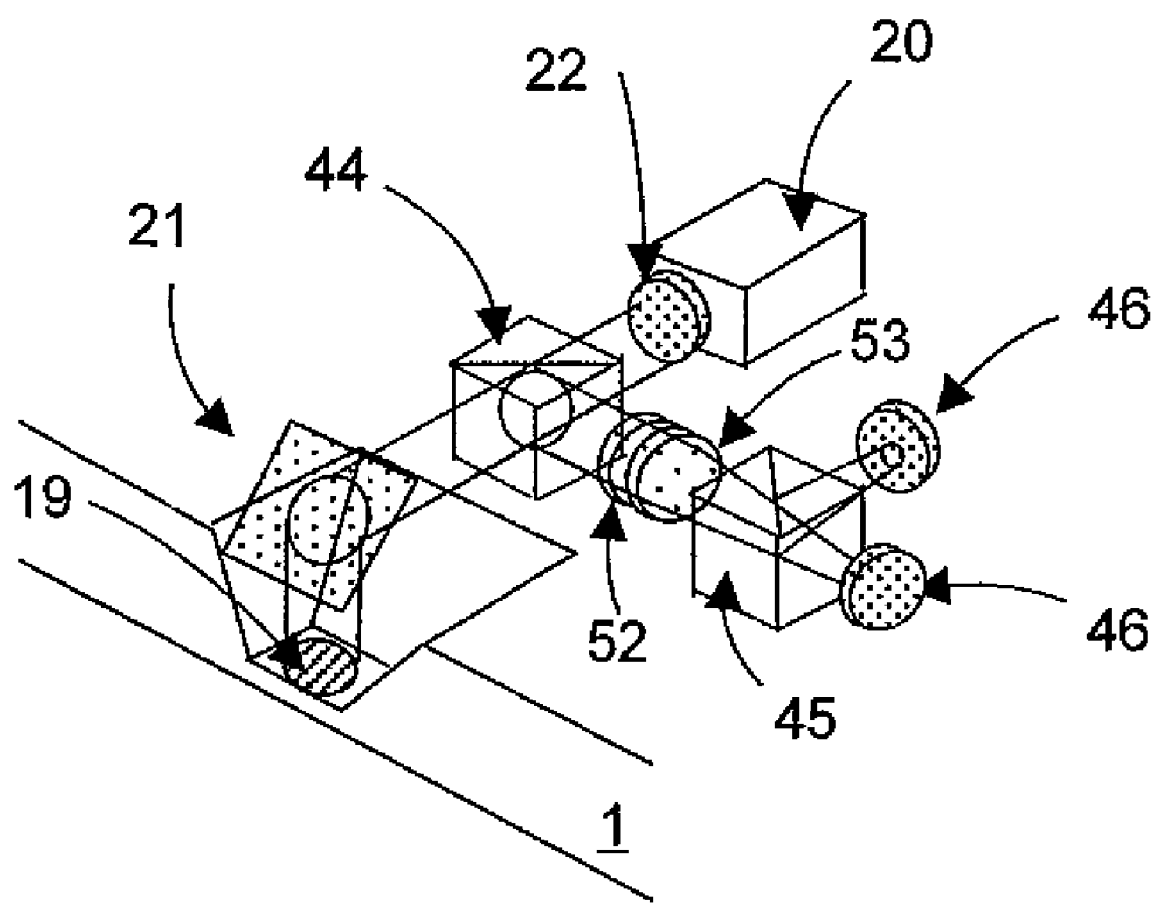
FIG. 20 is a diagram showing the head equipped with a reproducing optic system.

Instead of reproducing recorded data by the magnetic reproducing device 24, the data can be reproduced by detection of a polarization rotation of an optical feedback from the optical near-field generation device 2. In this case, as shown FIG. 20, a beam splitter 44 is installed in the space between the mirror 21 and the collimating lens 22 and the optical feedback from the optical near-field generation device 2 is split off. The optical feedback is split off into two polarizing directions by a polarizing beam splitter 45 after being transmitted through a half-wave plate 52 and a condenser lens 53. A regenerative signal is obtained by a differential detection of each light by two photodiodes 46.

Figure 21:
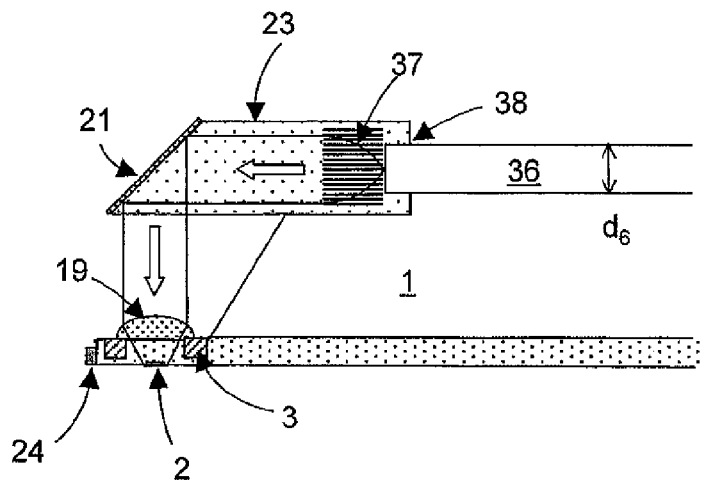
Figure 21:
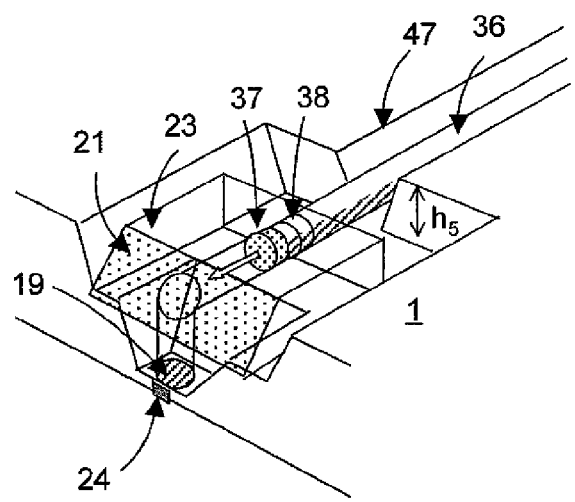
Figure 21:
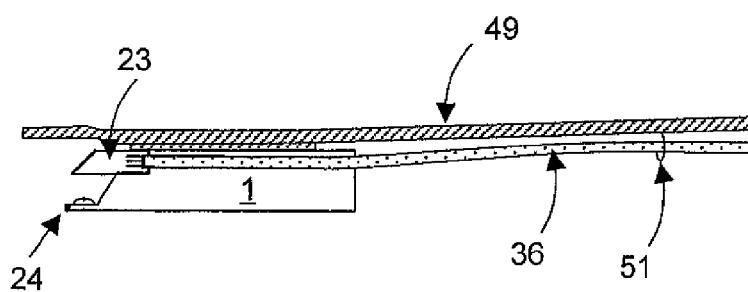

FIG. 21A, FIG. 21B, and FIG. 21C show an embodiment of introducing the light using an optical fiber instead of arranging the laser on the slider. A hole 38 with the same diameter as the outside diameter of the optical fiber is opened in the end of the glass substrate 23 in which the mirror is formed, and an optical fiber 36 is inserted therein. At the part of the glass substrate 23 at the tip of the optical fiber, a gradient-index lens 37 is formed, and an outgoing beam from the optical fiber 36 is collimated thereby. On the upper surface of the slider 1, a channel 47 is formed for storing the optical fiber so as to prevent the fiber from running against the suspension. The channel depth $h_5$ is made larger than the outside diameter $d_6$ of the fiber. The smaller the outside diameter $d_6$ of the fiber is, the smaller the rigidity of the fiber and the effects of the fiber to be exerted on the floating quantity are. When a channel is formed on the slider, there is a possibility of generation of warping on the slider floating surface; therefore, the channel depth $h_5$ is desired to be smaller as much as possible. For that purpose, in the present embodiments, the end part of 15 mm of the fiber with 125 µm in outside diameter is etched by a fluorinated acid solution, whereby the diameter $d_6$ is made 20 µm. The channel depth $h_5$ is made 30 µm. In order to minimize the effects of the fiber rigidity to be exerted on the floating quantity, the fiber 36 is fixed to a suspension 49 through a hook 51 or a tube (the fiber can be freely moved in the axial direction of the fiber).

Figure 22:
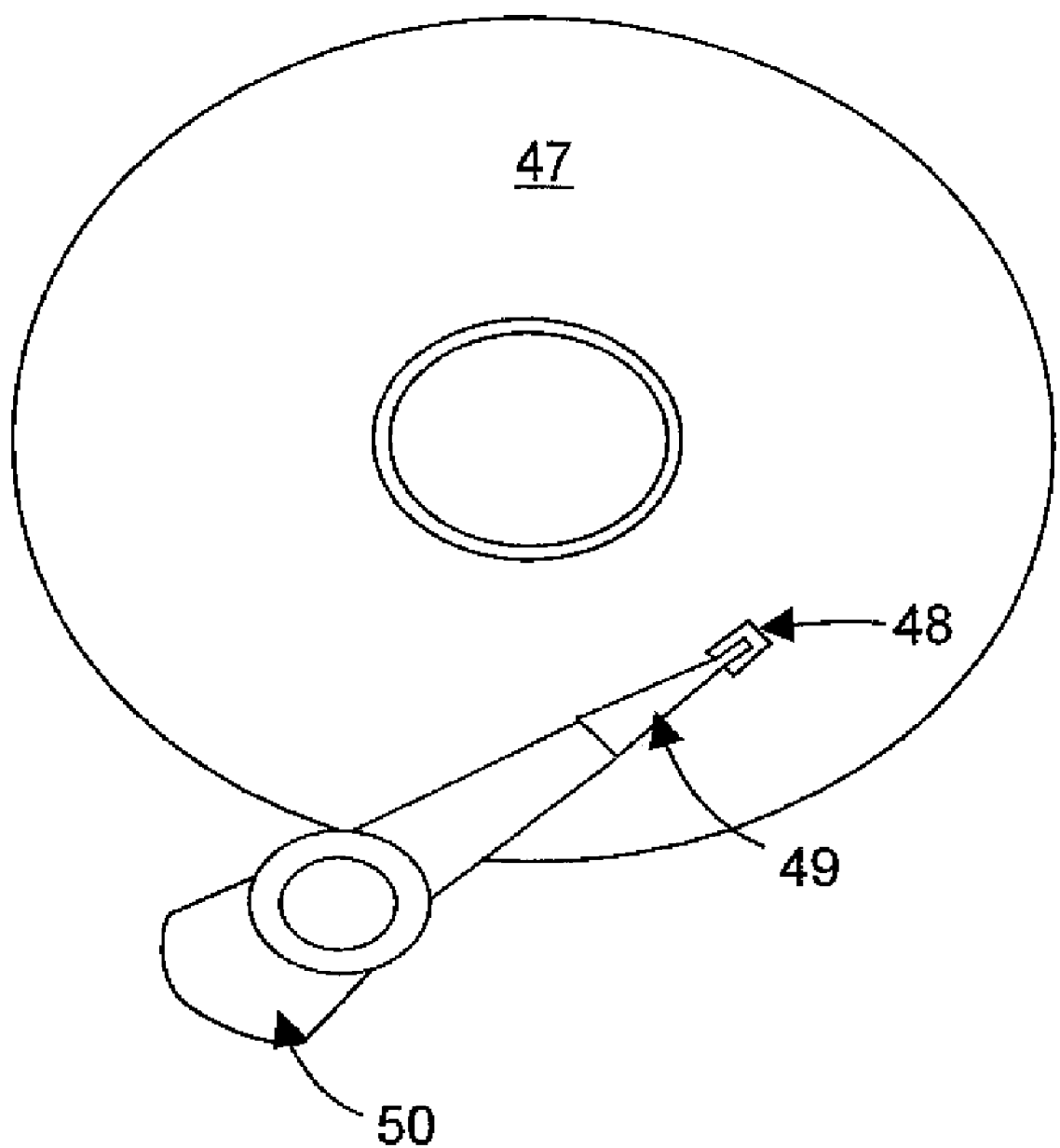
FIG. 22 is a diagram showing an equipment component of a recording/reproducing equipment.

FIG. 22 shows an example of application of the head of the present invention to the thermally assisted magnetic recording apparatus. In the present embodiments, for the head, as shown in FIG. 19A and FIG. 19B, a head in which the laser is mounted on the slider is used. A head 48 is fixed to the suspension 49, and the position is moved by a voice coil motor 50. On the surface of the head, a floating pad is formed and floated on a recording disk 47 by the floating quantity at not more than 10 nm. For the recording disk 47, a magneto optical medium is used. At the moment of recording, the laser 20 is emitted at the same time of application of the magnetic field by the coil 3, and a recording mark is formed. For reproducing, the GMR device 24 is used.

What is claimed is:

1. A head used for thermally assisted magnetic recording apparatus for recording data on a data recording medium by applying a magnetic field and an optical near-field thereto, wherein:

said head comprises a substrate with a recessed portion formed therein, the recessed portion having a light-transmitting bottom part;

an optical near-field generation device is formed on the surface of the recessed portion facing the data recording medium;

a magnetic field generation device is formed on the surface of the recessed portion opposite to the surface having the optical near-field generation device;

the optical near-field generation device is a metal element that generates plasmons; and the thickness of the recessed portion in a height direction from the surface facing the data recording medium is not more than the sum of the thickness of a coil of the magnetic field generation device and 1 µm.

2. The head according to claim 1, wherein an interconnecting part of the magnetic field generation device works as a heatsink layer.

3. The head according to claim 1, wherein a heatsink layer is provided on a side surface of the recessed portion.

4. The head according to claim 3, wherein the heatsink has optical transparency and is provided on the light-transmitting bottom part of the recessed portion.

* * * * *